United States Patent
Kitai (10) Patent No.: US 12,513,255 B2
(45) Date of Patent: Dec. 30, 2025

(54) INFORMATION PROCESSING APPARATUS, COMPUTER PROGRAM PRODUCT, AND METHOD USING READABLE INFORMATION FOR SPOT COLOR DESIGNATION IN DOCUMENT DATA

(71) Applicant: FUJIFILM Business Innovation Corp., Tokyo (JP)

(72) Inventor: Tsubasa Kitai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 315 days.

(21) Appl. No.: 18/189,229

(22) Filed: Mar. 24, 2023

(65) Prior Publication Data

US 2024/0056546 A1 Feb. 15, 2024

(30) Foreign Application Priority Data

Aug. 15, 2022 (JP) .................. 2022-129424

(51) Int. Cl.
*H04N 1/60* (2006.01)
*G06F 3/12* (2006.01)
*G06K 15/02* (2006.01)
*G06T 11/00* (2006.01)

(52) U.S. Cl.
CPC .......... *H04N 1/6072* (2013.01); *G06F 3/1204* (2013.01); *G06F 3/1242* (2013.01); *G06F 3/1247* (2013.01); *G06K 15/1809* (2013.01); *G06K 15/1811* (2013.01); *G06K 15/1848* (2013.01); *G06T 11/001* (2013.01)

(58) Field of Classification Search
CPC .......... H04N 1/54; H04N 1/60; H04N 1/6072; H04N 1/626; G06F 3/1204; G06F 3/1208; G06F 3/1228; G06F 3/1242; G06F 3/1247; G06K 15/1801; G06K 15/1803; G06K 15/1806; G06K 15/1807; G06K 15/1809; G06K 15/181; G06K 15/1811; G06K 15/1815; G06K 15/1825; G06K 15/1848; G06T 11/001; G06T 11/40; G06T 11/60

See application file for complete search history.

(56) References Cited

U.S. PATENT DOCUMENTS

| | | | | |
|---|---|---|---|---|
| 6,067,555 A * | 5/2000 | Hayashi | ................ | G06T 11/001 |
| | | | | 715/234 |
| 7,246,880 B2 * | 7/2007 | Ross | .................. | G06K 15/1825 |
| | | | | 347/14 |
| 9,733,872 B2 * | 8/2017 | Tsuwano | ................ | G06F 3/1247 |
| 10,841,456 B2 * | 11/2020 | Tsuwano | ........... | H04N 1/40068 |
| 11,659,130 B2 * | 5/2023 | Matsuda | ............... | G06F 3/1256 |
| | | | | 358/1.9 |
| 11,778,126 B2 * | 10/2023 | Saito | .................. | H04N 1/00411 |
| | | | | 358/1.9 |

(Continued)

FOREIGN PATENT DOCUMENTS

JP 2012058977 3/2012

*Primary Examiner* — Scott A Rogers
(74) *Attorney, Agent, or Firm* — JCIPRNET (57) ABSTRACT

An information processing apparatus includes a processor configured to execute a process of detecting an object that includes readable information regarding spot color designation in document data, excluding the detected object from a drawing target at a time of outputting the document data, and reflecting spot color drawing designated by the readable information on the drawing target.

11 Claims, 7 Drawing Sheets

(56) References Cited

U.S. PATENT DOCUMENTS

| | | | |
|---|---|---|---|
| 11,934,710 B2* | 3/2024 | Kurata | G06F 3/1285 |
| 12,014,091 B2* | 6/2024 | Komine | G06F 3/1256 |
| 2024/0089397 A1* | 3/2024 | Ono | H04N 1/54 |
| 2024/0106965 A1* | 3/2024 | Igarashi | G06F 3/1208 |
| 2024/0296543 A1* | 9/2024 | Noguchi | H04N 1/00023 |

* cited by examiner

INFORMATION PROCESSING APPARATUS, COMPUTER PROGRAM PRODUCT, AND METHOD USING READABLE INFORMATION FOR SPOT COLOR DESIGNATION IN DOCUMENT DATA

CROSS-REFERENCE TO RELATED APPLICATIONS

This application is based on and claims priority under 35 USC 119 from Japanese Patent Application No. 2022-129424 filed Aug. 15, 2022.

BACKGROUND

(i) Technical Field

The present invention relates to an information processing apparatus, a non-transitory computer readable medium storing a computer program, and an information processing method.

(ii) Related Art

JP2012-058977A discloses a printing control device that includes determination means, acquisition means, removal means, and issuing means. The determination means determines whether or not a specific object indicated by an instruction color for specifying a region in which printing is performed by using a spot color recording agent exists in original document data. The acquisition means acquires the instruction color indicating the specific object determined to exist by the determination means. The removal means removes, from the original document data, the specific object determined to exist by the determination means. The issuing means issues a drawing command for performing printing for an object with the spot color recording agent, the object being indicated by a color identical to the acquired instruction color among the remaining objects of the original document data, which are obtained by the removal means removing the specific object.

SUMMARY

In a case where a document to be printed with a spot color is created by an application that does not support the spot color, an operation of opening a setting screen of a printer driver to designate a spot-colored place or checking, on a preview screen, whether the color of the region is replaced with the spot color leads to a decrease in document creation efficiency and leads to work mistakes. Further, as the number of spot colors handled in one document increases, the difficulty of designating the spot color increases.

Aspects of non-limiting embodiments of the present disclosure relate to an information processing apparatus, a non-transitory computer readable medium storing a computer program, and an information processing method that enables designation and check of a spot color location without transition of a screen or a window during an edit of a document.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to detect an object that includes readable information regarding spot color designation in document data, and exclude the detected object from a drawing target at a time of outputting the document data, and reflect spot color drawing designated by the readable information on the drawing target.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described with reference to the drawings. The identical reference signs are denoted by the same or equivalent components and portions in the drawings. In addition, the dimensional ratios in the drawings are exaggerated for convenience of description and may differ from the actual ratios.

Figure 1:
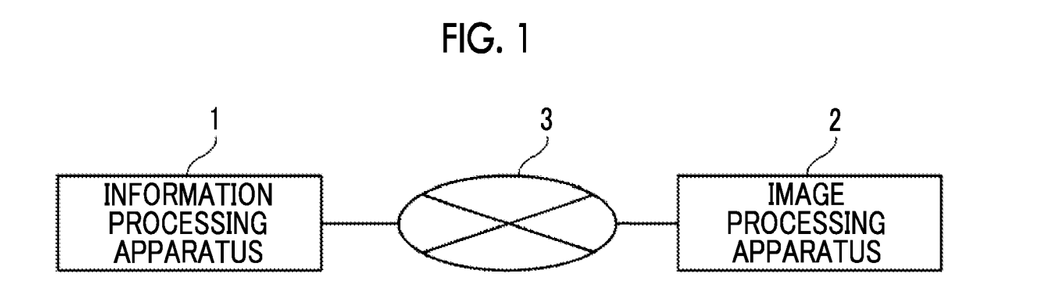
FIG. 1 is a diagram illustrating a schematic configuration of an image processing system according to the present exemplary embodiment.

FIG. 1 is a diagram illustrating a schematic configuration of an image processing system according to the present exemplary embodiment.

As illustrated in FIG. 1, the image processing system according to the present exemplary embodiment includes an information processing apparatus 1 and an image forming apparatus 2. In the present exemplary embodiment, only one information processing apparatus 1 and one image forming apparatus 2 will be described, but, in the present invention, a plurality of information processing apparatuses and a plurality of image forming apparatuses may be provided. Further, as the information processing apparatus 1, a personal computer may be applied, or a portable terminal such as a tablet terminal or a smartphone may be applied.

Each of the information processing apparatus 1 and the image forming apparatus 2 is connected to a communication line 3 such as a local area network (LAN) and an intranet. The information processing apparatus 1 and the image forming apparatus 2 are capable of mutually transmitting and receiving various types of data via the communication line 3.

The image forming apparatus 2 is an apparatus that enables not only image formation by using a yellow toner, a magenta toner, a cyan toner, and a black toner, but also image formation with a spot color using a spot color toner such as a bright toner, a white toner, and a transparent toner.

The information processing apparatus 1 or the image forming apparatus 2 according to the present exemplary embodiment is configured to enable designation and check of a spot color location without transition of a screen or a window during an edit of a document by the information processing apparatus 1. The information processing apparatus 1 and the image forming apparatus 2 will be described below in detail.

Figure 2:
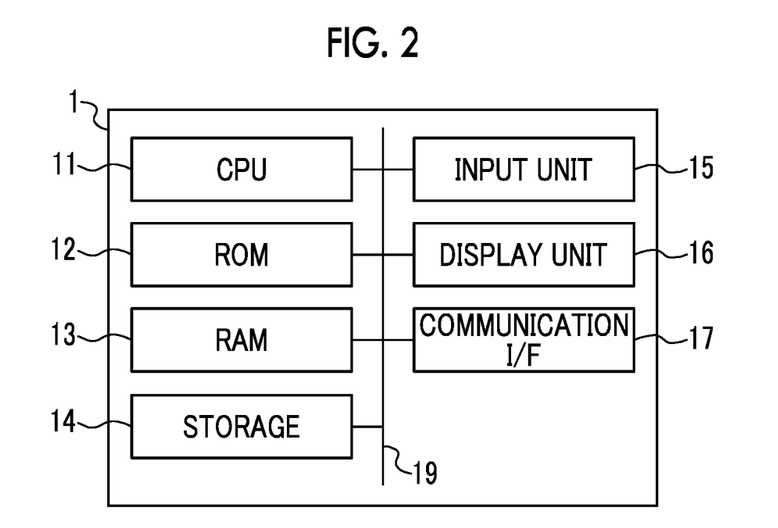
FIG. 2 is a block diagram illustrating a hardware configuration of an information processing apparatus in the present exemplary embodiment.

FIG. 2 is a block diagram illustrating a hardware configuration of the information processing apparatus 1 in the present exemplary embodiment.

As illustrated in FIG. 2, the information processing apparatus 1 includes components such as a central processing unit (CPU) 11, a read only memory (ROM) 12, a random access memory (RAM) 13, a storage 14, an input unit 15, a display unit 16, and a communication interface (UF) 17. The components are connected to each other via a bus 19 to be communicable with each other.

The CPU 11 is a central arithmetic processing unit that executes various programs and controls the units. That is, the CPU 11 reads the program from the ROM 12 or the storage 14, and executes the program using the RAM 13 as a work area. The CPU 11 controls the above components and performs various arithmetic processes, in accordance with the program recorded in the ROM 12 or the storage 14. In the present exemplary embodiment, the ROM 12 or the storage 14 stores an image processing program for spot-color-drawing a location designated as drawing of a spot color in the document data.

The ROM 12 stores various programs and various types of data. The RAM 13 temporarily stores the program or the data as a work area. The storage 14 is configured by a storage device such as a hard disk drive (HDD) or a solid state drive (SSD), and stores various programs including an operating system and various types of data.

The input unit 15 includes a pointing device such as a mouse, and a keyboard, and the input unit is used for performing various inputs.

The display unit 16 is, for example, a liquid crystal display and displays various types of information. The display unit 16 may adopt a touch panel type and function as the input unit 15.

The communication interface 17 is an interface for communicating with other devices such as the image forming apparatus 2. For example, standards such as Ethernet (registered trademark), FDDI, and Wi-Fi (registered trademark) are used for the communication interface.

In executing the above image processing program, the information processing apparatus 1 realizes various functions by using the above hardware resources. A functional configuration realized by the information processing apparatus 1 will be described.

Figure 3:
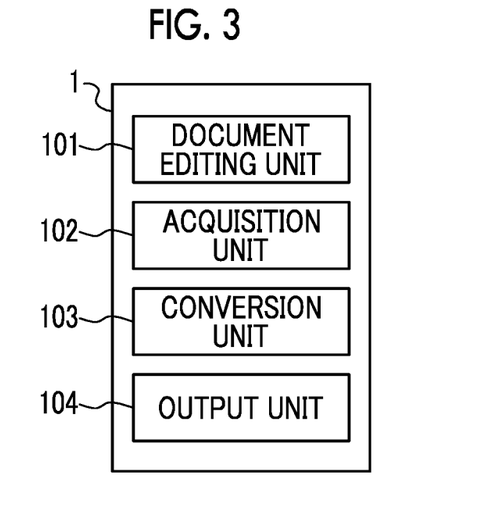
FIG. 3 is a block diagram illustrating an example of a functional configuration of the information processing apparatus.

FIG. 3 is a block diagram illustrating an example of the functional configuration of the information processing apparatus 1.

As illustrated in FIG. 3, the information processing apparatus 1 includes a document editing unit 101, an acquisition unit 102, a conversion unit 103, and an output unit 104 as functional components. Each functional component is realized by the CPU 11 reading and executing the image processing program stored in the ROM 12 or the storage 14.

The document editing unit 101 provides a user interface for causing a user to edit document data on the information processing apparatus 1. The document data edited by the user interface provided by the document editing unit 101 can serve as a drawing target in image formation by the image forming apparatus 2. The user is able to create an object including readable information regarding spot color designation by the user interface provided by the document editing unit 101. An example of the readable information regarding the spot color designation will be described later, but, in the present exemplary embodiment, a predetermined tag and a text string enclosed in tags are used as the readable information regarding the spot color designation.

The acquisition unit 102 acquires the document data edited by the user interface provided by the document editing unit 101.

In a case where the document data acquired by the acquisition unit 102 includes an object including the readable information regarding the spot color designation, the conversion unit 103 executes a process of excluding the object from the drawing target in the image forming apparatus 2. Further, in a case where the document data acquired by the acquisition unit 102 includes an object including the readable information regarding the spot color designation, the conversion unit 103 executes a process of reflecting spot color drawing designated by the readable information on the drawing target in the image forming apparatus 2.

The conversion unit 103 may execute a process of acquiring information on a drawing color of the object including the readable information regarding the spot color designation and reflecting the acquired drawing color on the drawing target of the image forming apparatus 2. In this case, the conversion unit 103 may execute a process of acquiring information on a drawing color of at least a portion of a text string described as the readable information included in the object including the readable information regarding the spot color designation, and reflecting the acquired drawing color on the spot color designated by the information.

In addition, the conversion unit 103 may execute a process of acquiring information on the coordinates of the object including the readable information regarding the spot color designation, reflecting the spot color drawing designated by the readable information on another object drawn in the acquired coordinates. In this case, the conversion unit 103 may execute a process of acquiring information on the drawing color of the other object and reflecting the acquired drawing color on the other object at the time of outputting the document data by the image forming apparatus 2. Further, in this case, the conversion unit 103 may execute a process of reflecting the acquired drawing color in the control of spot-color-drawing the entirety of the other object at the time of outputting the document data by the image forming apparatus 2.

In addition, in a case where the readable information is a content for spot-color-drawing an entire page on which there is the object including the readable information regarding the spot color designation, the conversion unit 103 may execute a process of drawing the entire page with the spot color, and combining the drawn page with a predetermined page before the drawn page and outputting a result of the combination. In this case, the conversion unit 103 may execute a process of determining the combination order of the pages based on the readable information and outputting the document data from the image forming apparatus 2.

The conversion unit 103 may execute a process of excluding the page on which only the object including the readable information regarding the spot color designation is drawn, from an output target of the document data from the image forming apparatus 2.

An example of the readable information and an example of conversion to a spot color based on the readable information in the present exemplary embodiment will be described in detail later.

The output unit 104 outputs a printing command for performing printing of the document data that is edited by the user interface provided by the document editing unit 101 and is converted by the conversion unit 103, to the image forming apparatus 2 via the communication line 3. The image forming apparatus 2 executes an image forming process based on the printing command for performing printing of the document data output from the information processing apparatus 1.

The information processing apparatus 1 according to the present exemplary embodiment has such a configuration so that, by causing the user to describe the readable information regarding the spot color designation, the user may be caused to designate the spot color location without transition of a screen or a window during an edit of the document data and to check the spot color location.

Figure 4:
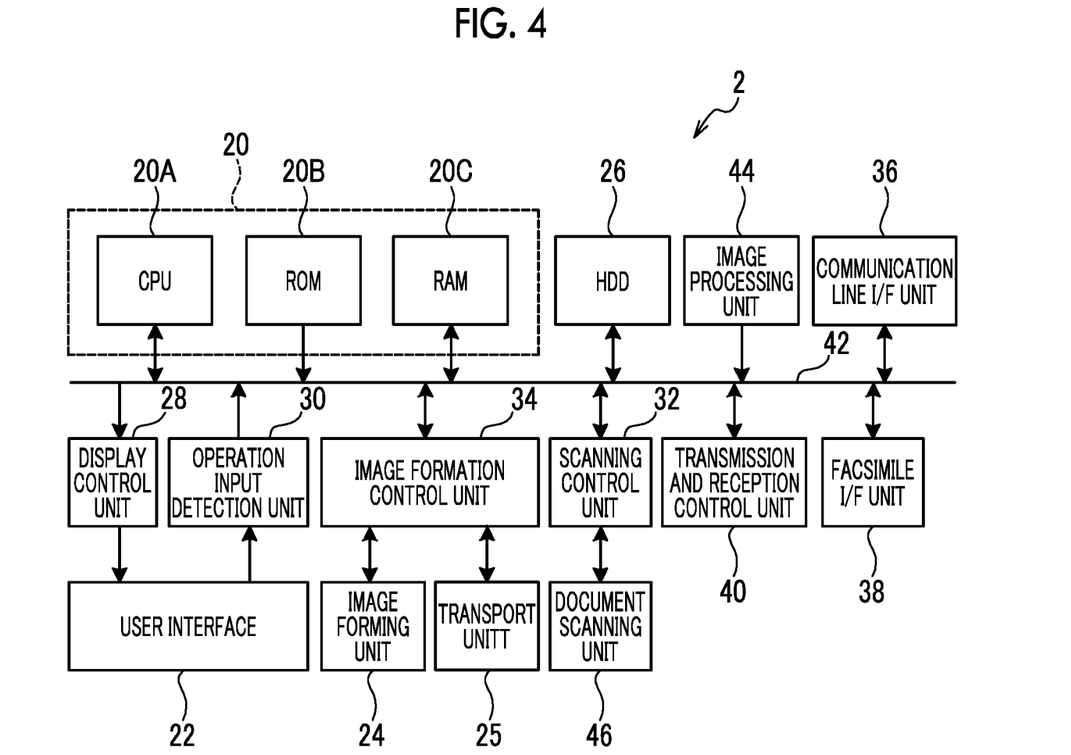
FIG. 4 is a block diagram illustrating a configuration of a main part of an electrical system of an image forming apparatus according to the present exemplary embodiment.

FIG. 4 is a block diagram illustrating the configuration of the main part of an electrical system of the image forming apparatus 2 according to the present exemplary embodiment.

As illustrated in FIG. 4, the image forming apparatus 2 according to the present exemplary embodiment includes a control unit 20 including a CPU 20A, a ROM 20B, and a RAM 20C. The CPU 20A controls the overall operation of the image forming apparatus 2. The RAM 20C is used as a work area or the like during execution of various programs by the CPU 20A. Various control programs, various parameters, and the like are stored in advance in the ROM 20B. In the image forming apparatus 2, the components of the control unit 20 are electrically connected to each other by a system bus 42.

On the other hand, the image forming apparatus 2 according to the present exemplary embodiment includes an HDD 26 that stores various types of data, application programs, and the like. The image forming apparatus 2 further includes a display control unit 28 that is connected to the user interface 22 and controls display of various operation screens and the like on the display of the user interface 22. The image forming apparatus 2 further includes an operation input detection unit 30 that is connected to the user interface 22 and detects an operation instruction input via the user interface 22. In the image forming apparatus 2, the HDD 26, the display control unit 28, and the operation input detection unit 30 are electrically connected to the system bus 42. In the image forming apparatus 2 according to the present exemplary embodiment, an example including the HDD 26 will be described. The present invention is not limited to this, and the image forming apparatus 2 may include a non-volatile storage unit such as a flash memory. In the present exemplary embodiment, the RAM 20C or the HDD 26 stores an image processing program for spot-color-drawing a location designated as drawing of a spot color in the document data.

The image forming apparatus 2 according to the present exemplary embodiment further includes a scanning control unit 32 and an image formation control unit 34. The scanning control unit 32 controls an optical image scanning operation by a document scanning unit 46 and a document feeding operation by a document transport unit. The image formation control unit 34 controls the image forming process by an image forming unit 24 and transport of paper to the image forming unit 24 by a transport unit 25. The image forming unit 24 performs not only image forming by using a yellow toner, a magenta toner, a cyan toner, and a black toner, but also image forming with a spot color using a spot color toner such as a bright toner, a white toner, and a transparent toner.

The image forming apparatus 2 further includes a communication line interface (communication line I/F) unit 36 and an image processing unit 44. The communication line I/F unit 36 is connected to the communication line 3 and performs transmission and reception of communication data to and from another external device such as the information processing apparatus 1 connected to the communication line 3. The image processing unit 44 executes various image processes. The image forming apparatus 2 further includes a facsimile interface (facsimile I/F) unit 38 that is connected to a telephone line (not illustrated) and performs transmission and reception of facsimile data to and from a facsimile device connected to the telephone line.

The image forming apparatus 2 further includes a transmission and reception control unit 40 that controls transmission and reception of facsimile data via the facsimile interface unit 38. In the image forming apparatus 2, the transmission and reception control unit 40, the scanning control unit 32, the image formation control unit 34, the communication line interface unit 36, the facsimile interface unit 38, and the image processing unit 44 are electrically connected to the system bus 42.

With the above configuration, the image forming apparatus 2 according to the present exemplary embodiment executes an access to each of the RAM 20C, the ROM 20B, and the HDD 26 by the CPU 20A. In addition, the image forming apparatus 2 controls display of information such as an operation screen and various messages on the display of the user interface 22 via the display control unit 28 by the CPU 20A. In addition, the image forming apparatus 2 controls the operation of the document scanning unit 46 and the document transport unit via the scanning control unit 32 by the CPU 20A. In addition, the image forming apparatus 2 performs each of control of the operation of the image forming unit 24 and the transport unit 25 via the image formation control unit 34 and control of the transmission and reception of communication data via the communication line interface unit 36 by the CPU 20A. In addition, the image forming apparatus 2 controls transmission and reception of facsimile data via the facsimile interface unit 38 by the transmission and reception control unit 40 by the CPU 20A. Further, in the image forming apparatus 2, the CPU 20A grasps an operation content in the user interface 22 based on operation information detected by the operation input detection unit 30. The image forming apparatus 2 performs various controls based on the operation content. Forming an image on paper may be referred to as printing below.

Figure 5:
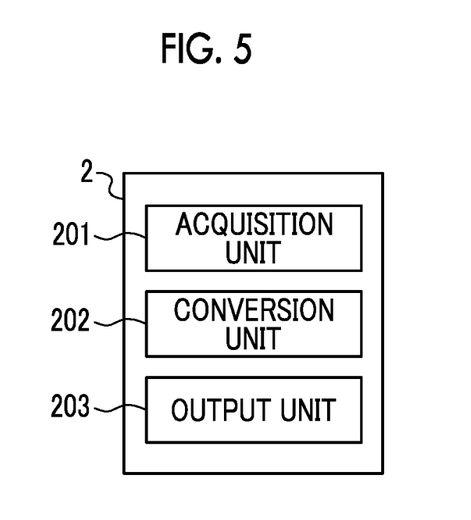
FIG. 5 is a block diagram illustrating an example of a functional configuration of the image forming apparatus.

The image process by the information processing apparatus 1 described above may be executed by the image forming apparatus 2. Next, the functional configuration of the image forming apparatus 2 will be described.

FIG. 5 is a block diagram illustrating an example of the functional configuration of the image forming apparatus 2.

As illustrated in FIG. 5, the image forming apparatus 2 includes an acquisition unit 201, a conversion unit 202, and an output unit 203 as functional components. Each functional component is realized by the CPU 20A reading and executing the image processing program stored in the ROM 20B or the HDD 26.

The acquisition unit 201 acquires the document data edited by the information processing apparatus 1 via the communication line 3.

In a case where the document data acquired by the acquisition unit 201 includes an object including the readable information regarding the spot color designation, the conversion unit 202 executes a process of excluding the object from the drawing target in the image forming apparatus 2. Further, in a case where the document data acquired by the acquisition unit 201 includes an object including the readable information regarding the spot color designation, the conversion unit 202 executes a process of reflecting spot color drawing designated by the readable information on the drawing target in the image forming apparatus 2.

The conversion unit 202 may execute a process of acquiring information on a drawing color of the object including the readable information regarding the spot color designation and reflecting the acquired drawing color on the drawing target of the image forming apparatus 2. In this case, the conversion unit 202 may execute a process of acquiring information on a drawing color of at least a portion of a text string described as the readable information included in the object including the readable information regarding the spot color designation, and reflecting the acquired drawing color on the spot color designated by the information.

In addition, the conversion unit 202 may execute a process of acquiring information on the coordinates of the object including the readable information regarding the spot color designation, reflecting the spot color drawing designated by the readable information on another object drawn in the acquired coordinates. In this case, the conversion unit 202 may execute a process of acquiring information on the drawing color of the other object and reflecting the acquired drawing color on the other object at the time of outputting the document data by the image forming apparatus 2. Further, in this case, the conversion unit 202 may execute a process of reflecting the acquired drawing color in the control of spot-color-drawing the entirety of the other object at the time of outputting the document data by the image forming apparatus 2.

In addition, in a case where the readable information is a content for spot-color-drawing an entire page on which there is the object including the readable information regarding the spot color designation, the conversion unit 202 may execute a process of drawing the entire page with the spot color, and combining the drawn page with a predetermined page before the drawn page and outputting a result of the combination. In this case, the conversion unit 103 may execute a process of determining the combination order of the pages based on the readable information and outputting the document data from the image forming apparatus 2.

The conversion unit 202 may execute a process of excluding the page on which only the object including the readable information regarding the spot color designation is drawn, from an output target of the document data from the image forming apparatus 2.

The output unit 203 outputs the document data converted by the conversion unit 202 to the image forming unit 24 via the image formation control unit 34, and causes the image forming unit 24 to perform image formation based on the document data.

Next, the operation of the information processing apparatus 1 or the image forming apparatus 2 will be described.

Figure 6:
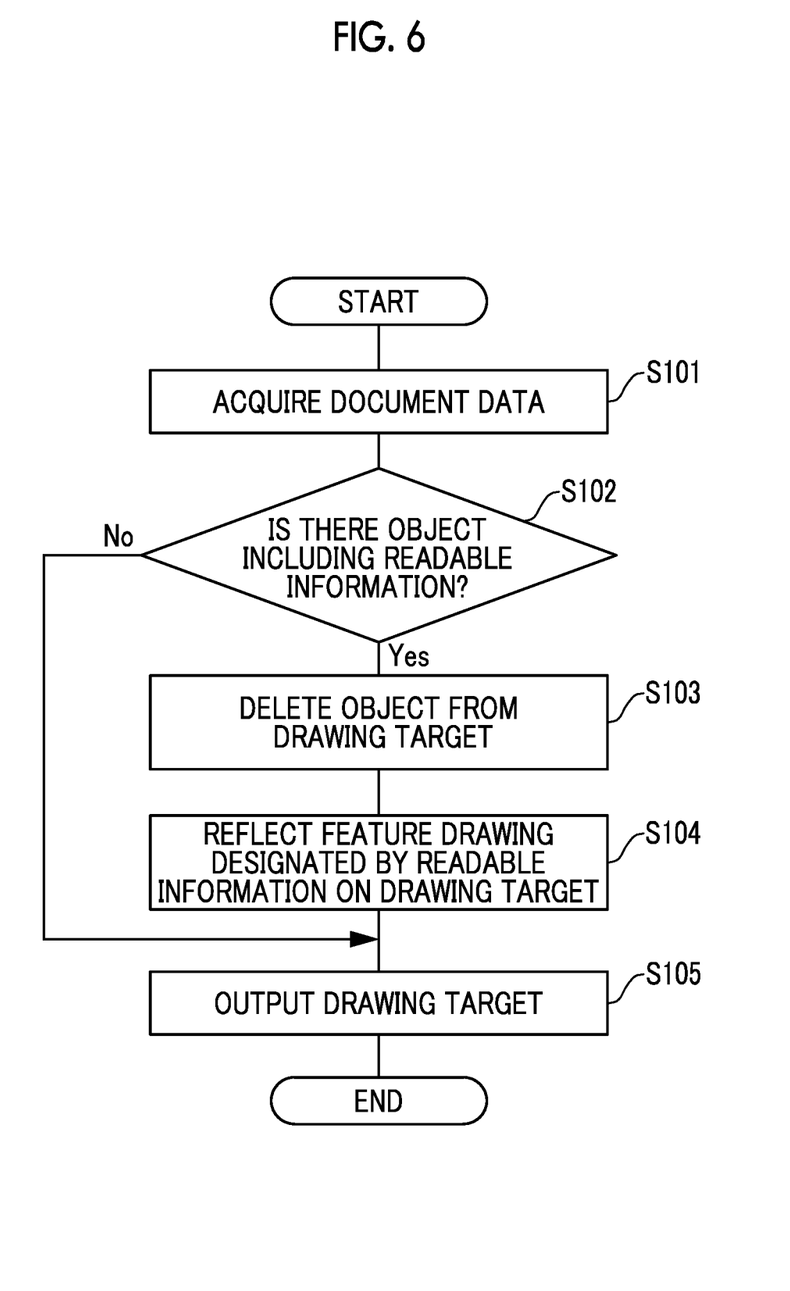
FIG. 6 is a flowchart illustrating a flow of an image process by the information processing apparatus or the image forming apparatus.

FIG. 6 is a flowchart illustrating a flow of the image process by the information processing apparatus 1 or the image forming apparatus 2. In the information processing apparatus 1, the CPU 11 reads the image processing program from the ROM 12 or the storage 14, loads the image processing program into the RAM 13, and executes the image process. In the image forming apparatus 2, the CPU 20A reads the image processing program from the ROM 20B or the HDD 26, loads the image processing program into the RAM 20C, and executes the image process.

In the following description, the image process by the information processing apparatus 1 will be described. The image process described below is triggered by an instruction from the user of the information processing apparatus 1 to perform printing of the document data from the image forming apparatus 2.

The CPU 11 acquires the document data edited by the user in Step S101. The acquired document data is a drawing target in the image forming apparatus 2.

Following Step S101, in Step S102, the CPU 11 determines whether or not the acquired document data includes an object including readable information regarding the spot color designation.

As a result of the determination in Step S102, in a case where the document data includes the object including the readable information regarding the spot color designation (Step S102; Yes), in Step S103, the CPU 11 deletes the object from the document data being the drawing target in the image forming apparatus 2.

Following Step S103, in Step S104, the CPU 11 reflects the spot color drawing designated by the readable information, on the document data being the drawing target in the image forming apparatus 2.

Following Step S104, in Step S105, the CPU 11 outputs the document data being the drawing target in the image forming apparatus 2, on which the spot color drawing has been reflected, to the image forming apparatus 2.

On the other hand, as a result of the determination in Step S102, in a case where the document data does not include the object including the readable information regarding the spot color designation (Step S102; No), the CPU 11 subsequently skips the processes of Steps S103 and S104. In Step S105, the CPU 11 outputs the document data being the drawing target in the image forming apparatus 2, to the image forming apparatus 2.

Subsequently, a specific example of the image process by the information processing apparatus 1 or the image forming apparatus 2 will be described.

Figure 7:
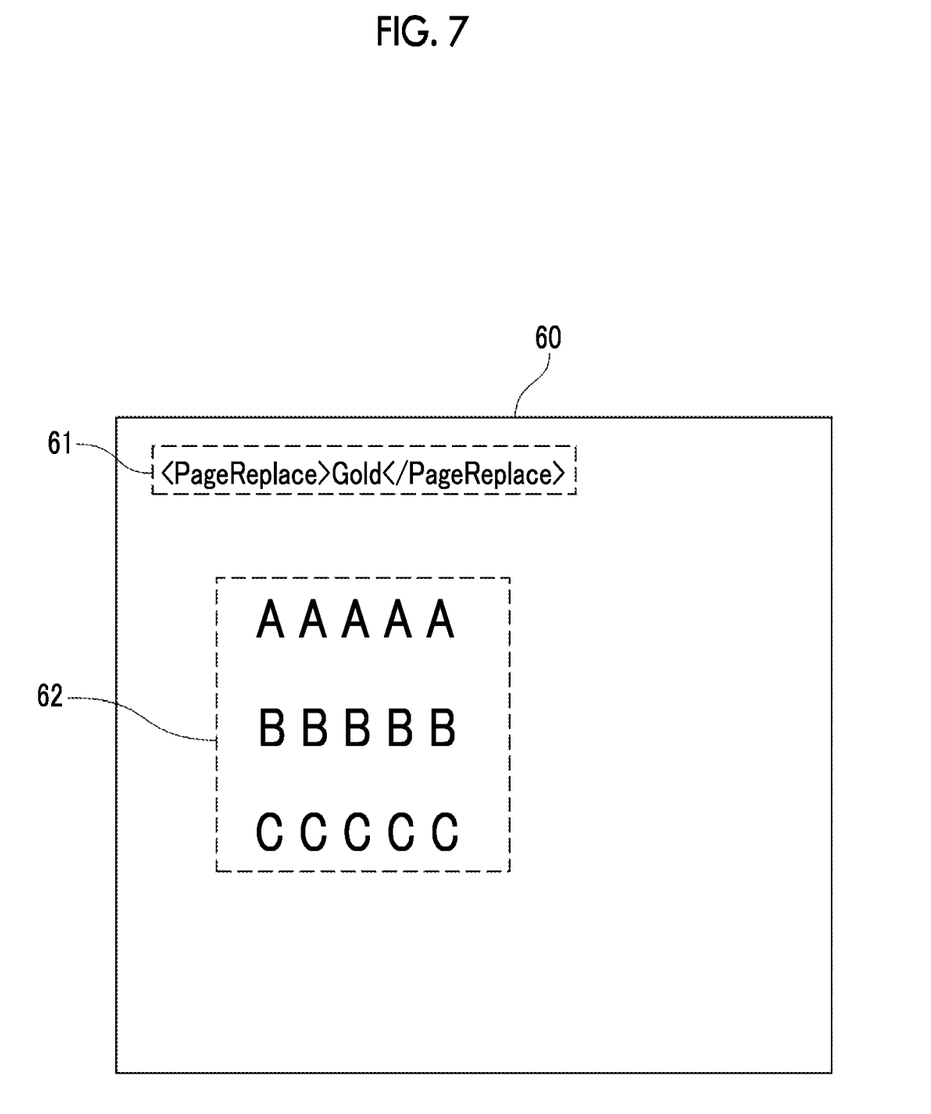
FIG. 7 is a diagram illustrating an example of document data created by a user.

FIG. 7 is a diagram illustrating an example of the document data created by the user. FIG. 7 illustrates document data 60 including an object 61 including readable information regarding the spot color designation and an object 62 as a target of the spot color designation. The broken line illustrated in FIG. 7 is provided to indicate the range of the object and is not a drawing target.

In FIG. 7, the readable information "<PageReplace>Gold</PageReplace>" regarding the spot color designation, which is included in the object 61, is provided for designating all colors identical to the colors set in a text string of the readable information on the page identical to the readable information, to be replaced with a spot color gold color. Specifically, in a case where the color set in the text string of "Gold" designated by the element "PageReplace" is yellow, the information processing apparatus 1 or the image forming apparatus 2 executes the above-described image process, and thus all the yellow drawings on the page are replaced with the spot color gold color and then output. For example, in a case where "AAAAA" is drawn in yellow, "BBBBB" is drawn in red, and "CCCCC" is drawn in black in the object 62, respectively, only "AAAAA" is replaced with the spot color gold color and then output by the image process of the information processing apparatus 1 or the image forming apparatus 2.

Figure 8:
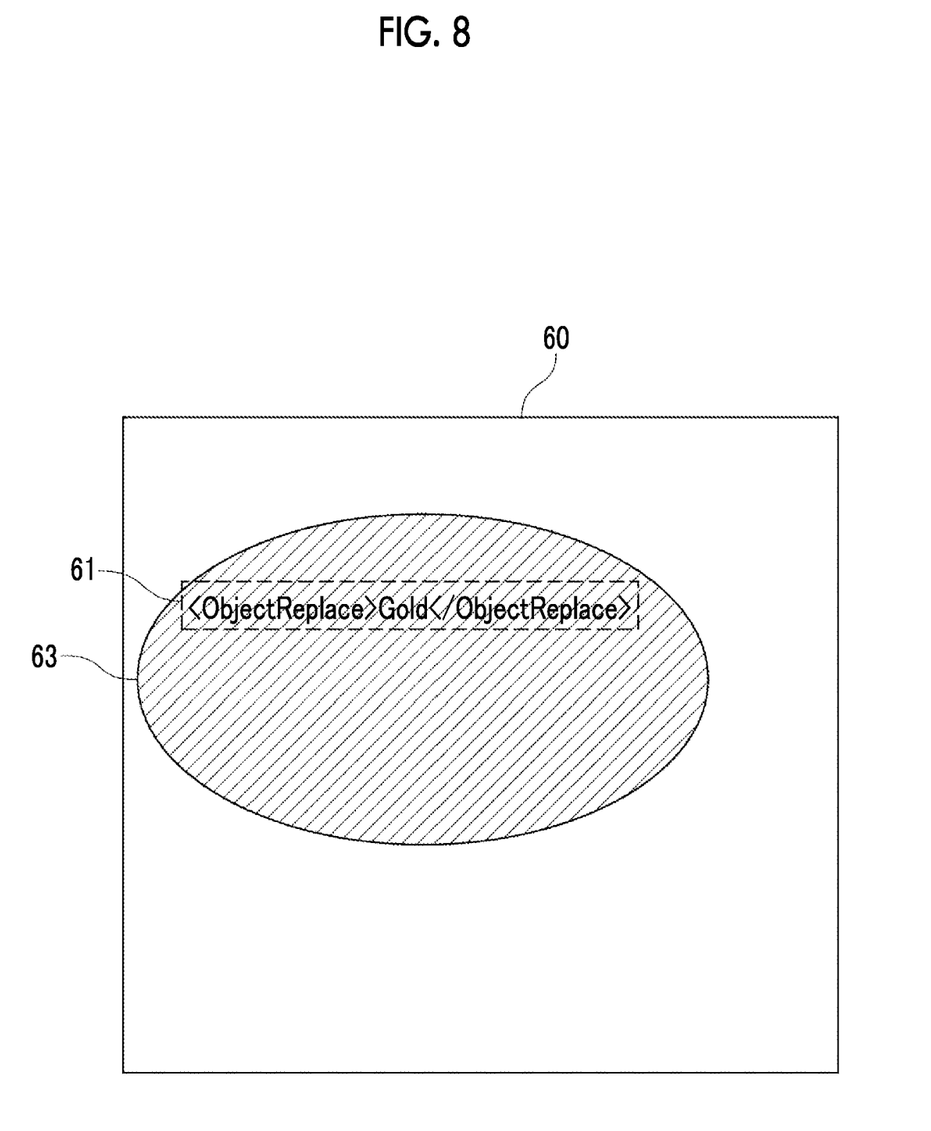
FIG. 8 is a diagram illustrating another example of the document data created by the user.

FIG. 8 is a diagram illustrating another example of the document data created by the user. FIG. 8 illustrates document data 60 including an object 61 including readable information regarding the spot color designation and an object 63 as a target of the spot color designation. The broken line illustrated in FIG. 8 is provided to indicate the range of the object and is not a drawing target.

In FIG. 8, readable information "<ObjectReplace>Gold</ObjectReplace>" regarding the spot color designation, which is included in the object 61 overlapping the object 63 is provided for designating all colors identical to the colors set in a text string of the readable information on the object 63, to be replaced with a spot color gold color. For example, in a case where the color set in the text string of "Gold" designated by the element "ObjectReplace" is yellow, the information processing apparatus 1 or the image forming apparatus 2 executes the above-described image process, and thus all the yellow drawings on the object 63 are replaced with the spot color gold color and then output.

Figure 9:
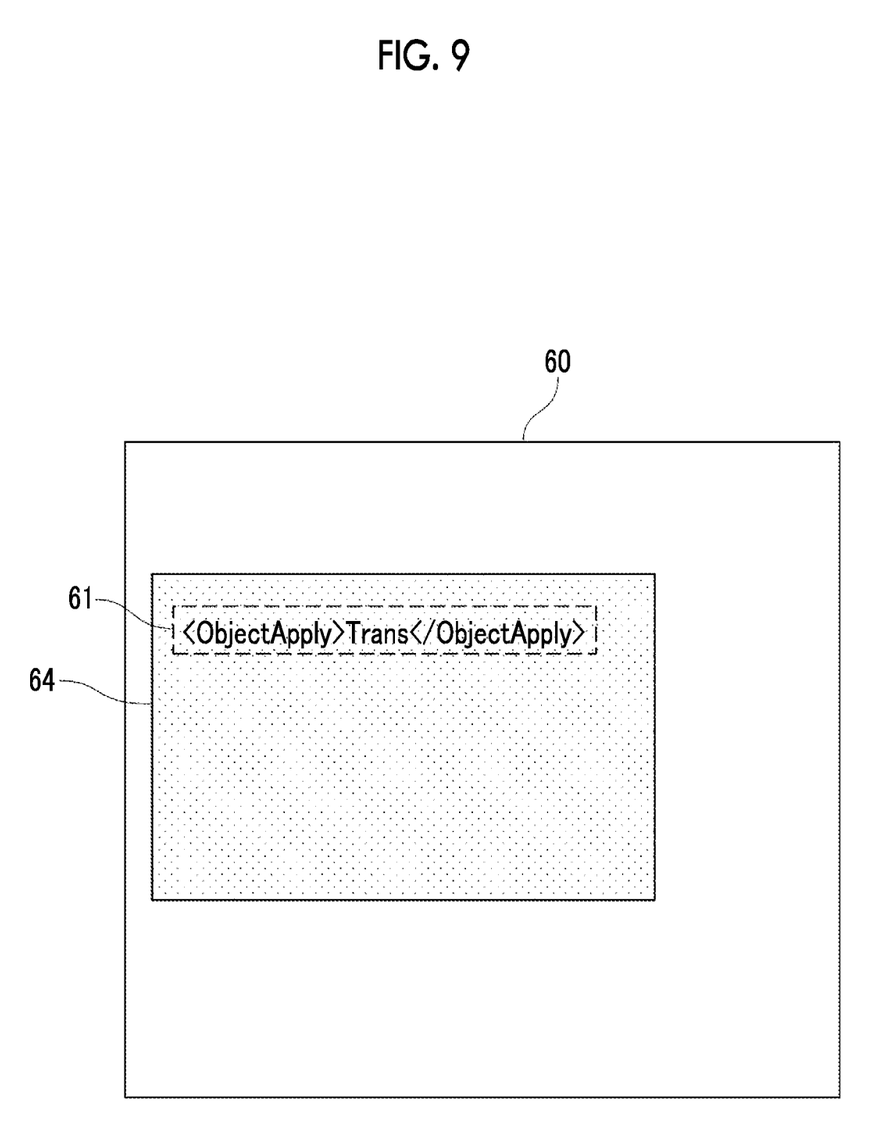
FIG. 9 is a diagram illustrating still another example of the document data created by the user.

FIG. 9 is a diagram illustrating still another example of the document data created by the user. FIG. 9 illustrates document data 60 including an object 61 including readable information regarding the spot color designation and an object 64 as a target of the spot color designation. The broken line illustrated in FIG. 9 is provided to indicate the range of the object and is not a drawing target.

In FIG. 9, readable information "<ObjectApply>Trans</ObjectApply>" regarding the spot color designation, which is included in the object 61 overlapping the object 64 is provided for designating application of coating with a transparent toner to the object 64. In a case where the object is created by the user as illustrated in FIG. 9, the information processing apparatus 1 or the image forming apparatus 2 executes the above-described image process, thereby the object 64 is coated with the transparent toner and then is output.

Figure 10:
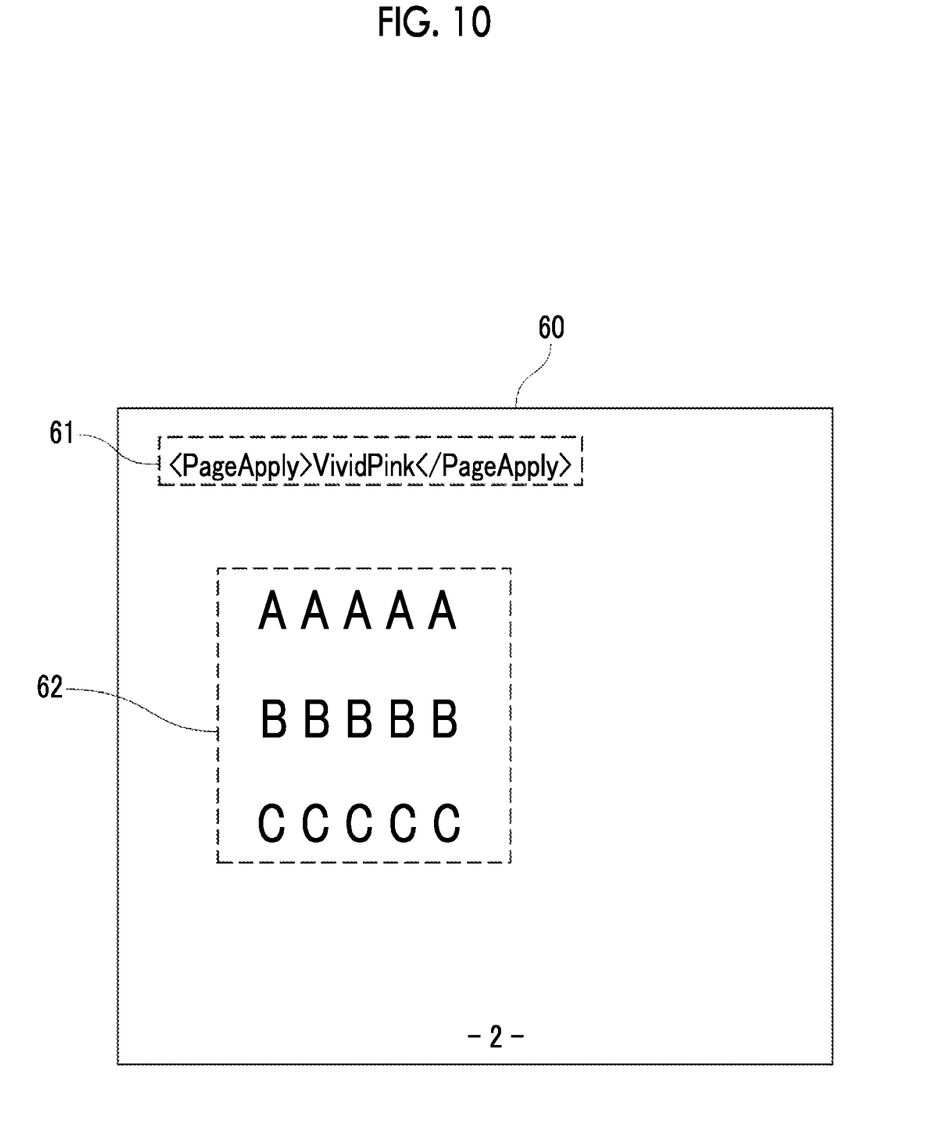
FIG. 10 is a diagram illustrating still yet another example of the document data created by the user.

FIG. 10 is a diagram illustrating still yet another example of the document data created by the user. FIG. 10 illustrates document data 60 including an object 61 including readable information regarding the spot color designation and an object 62 as a target of the spot color designation. The broken line illustrated in FIG. 10 is provided to indicate the range of the object and is not a drawing target.

In FIG. 10, readable information "<PageApply>VividPink</PageApply>" regarding the spot color designation, which is included in the object 61, is provided for designating the page identical to the readable information to be combined with a different page in a state of replacing all the colors of the object as the drawing target on the page with a spot color pink. For example, in the object 62, in a case where "AAAAA" is drawn in yellow, "BBBBB" " " is drawn in red, and "CCCCC" is drawn in black, respectively. In addition, all "AAAAA", "BBBBB", and "CCCCC" are replaced with the spot color pink, and then is combined with another page and output. The page as a combination target may be a page immediately before this page or a page immediately after this page.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

In each exemplary embodiment, the aspect in which the image processing program is stored (installed) in advance in the ROM or the storage has been described, but the present invention is not limited to this. The program may be provided in a form of being recorded on a non-transitory medium such as a compact disk read only memory (CD-ROM), a digital versatile disk read only memory (DVD-ROM), and a universal serial bus (USB) memory. Further, the program may be in a form of being downloaded from an external device via a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
execute a process of detecting an object that includes readable information regarding spot color designation in document data; and
execute a process of excluding the detected object from a drawing target at a time of outputting the document data, and reflecting spot color drawing designated by the readable information on the drawing target.

2. The information processing apparatus according to claim 1, wherein the processor configured to:
execute a process of acquiring information on a drawing color of the object, and reflecting the acquired information on the drawing color on the drawing target.

3. The information processing apparatus according to claim 2, wherein the processor configured to:
execute a process of acquiring information on a drawing color of at least a portion of a text string described as the readable information included in the object, and reflecting the acquired drawing color on a spot color designated by the readable information.

4. The information processing apparatus according to claim 1, wherein the processor configured to:
execute a process of acquiring information on coordinates of the object, and reflecting the spot color drawing designated by the readable information on another object drawn in the acquired coordinates.

5. The information processing apparatus according to claim 4, wherein the processor configured to:
execute a process of acquiring information on a drawing color of the other object, and reflecting the acquired drawing color on the other object at the time of outputting the document data.

6. The information processing apparatus according to claim 5, wherein the processor configured to:
execute a process of reflecting the acquired drawing color in a control of spot-color-drawing an entirety of the other object at the time of outputting the document data.

7. The information processing apparatus according to claim 1, wherein the processor configured to:
execute a process of, in a case where the readable information is a content for spot-color-drawing an entire page on which there is the object, drawing the entire page with a spot color, and combining the drawn page with a predetermined page before the drawn page and output a result of the combination.

8. The information processing apparatus according to claim 7, wherein the processor is configured to:
execute a process of determining a combination order of pages based on the readable information and output the document data.

9. The information processing apparatus according to claim 1, wherein the processor is configured to:
execute a process of excluding a page on which only the object is drawn from an output target of the document data.

10. A non-transitory computer readable medium storing a computer program causing a computer to execute a process comprising:
detecting an object that includes readable information regarding spot color designation in document data, and
excluding the detected object from a drawing target at a time of outputting the document data, and reflecting spot color drawing designated by the readable information on the drawing target.

11. An information processing method comprising:
detecting an object that includes readable information regarding spot color designation in document data; and
excluding the detected object from a drawing target at a time of outputting the document data, and reflecting spot color drawing designated by the readable information on the drawing target.

* * * * *